(12) United States Patent
Inoue et al.

(10) Patent No.: US 7,773,745 B2
(45) Date of Patent: Aug. 10, 2010

(54) OPENING MECHANISM HAVING A SOLID BODY, A MOVABLE BODY AND A GUIDE MECHANISM FOR SLIDING THE MOVABLE BODY WITH RESPECT TO THE SOLID BODY

(75) Inventors: Takefumi Inoue, Nara (JP); Koji Sakai, Tsuruga (JP)

(73) Assignee: Panasonic Corporation, Osaka (JP)

( * ) Notice: Subject to any disclaimer, the term of this patent is extended or adjusted under 35 U.S.C. 154(b) by 1137 days.

(21) Appl. No.: 11/206,580

(22) Filed: Aug. 18, 2005

(65) Prior Publication Data

US 2006/0045260 A1  Mar. 2, 2006

(30) Foreign Application Priority Data

Aug. 25, 2004 (JP) .............................. 2004-245578

(51) Int. Cl.
*H04M 1/00* (2006.01)
*H04M 9/00* (2006.01)

(52) U.S. Cl. ................. 379/433.12; 455/575.4

(58) Field of Classification Search ............ 379/433.12; 455/575.4, 575.1; 16/239, 362
See application file for complete search history.

(56) References Cited

U.S. PATENT DOCUMENTS

| 6,073,027 | A  | * | 6/2000 | Norman et al. | .......... | 455/575.4 |
| 7,267,317 | B2 | * | 9/2007 | Kato et al.   | ............ | 248/429   |
| 7,319,892 | B2 | * | 1/2008 | Kato          | ............ | 455/575.4 |
| 7,376,449 | B2 | * | 5/2008 | Mizuta et al. | ............ | 455/575.3 |
| 2004/0085739 | A1 | | 5/2004 | Lee et al. | | |
| 2005/0000059 | A1 | | 1/2005 | Sung et al. | | |
| 2005/0009581 | A1 | * | 1/2005 | Im et al. | ............ | 455/575.4 |
| 2005/0119034 | A1 | * | 6/2005 | Kato et al. | ............ | 455/575.4 |
| 2008/0075274 | A1 | * | 3/2008 | Huang et al. | ............ | 379/433.12 |

FOREIGN PATENT DOCUMENTS

| JP | 61-165529 | | 10/1986 |
| JP | 5-82084 | | 11/1993 |
| JP | 2003-1106 A | | 4/2003 |
| JP | 2005-291315 A | | 10/2005 |
| JP | 2006-050204 A | | 2/2006 |
| JP | 2008017133 A | * | 1/2008 |
| KR | 10-2004-0027294 A | | 4/2004 |
| KR | 10-2004-0044213 A | | 5/2004 |
| KR | 10-2004-0062765 A | | 7/2004 |
| WO | WO 2006/013702 A1 | | 2/2006 |

* cited by examiner

*Primary Examiner*—Fan Tsang
*Assistant Examiner*—Phylesha Dabney
(74) *Attorney, Agent, or Firm*—RatnerPrestia

(57) ABSTRACT

An opening mechanism has a guide mechanism which holds the movable body in such a manner as to be slidable in the predetermined direction with respect to the planar solid body. This structure allows the solid body, the movable body and the guide bodies to be made of planar materials such as a steel plate, thereby enabling the opening mechanism to have a thinner profile. In addition, these components can be produced by a comparatively simple process such as press working, making it possible to provide a less expensive opening mechanism. A thin electronic device using this opening mechanism is also provided.

3 Claims, 3 Drawing Sheets

OPENING MECHANISM HAVING A SOLID BODY, A MOVABLE BODY AND A GUIDE MECHANISM FOR SLIDING THE MOVABLE BODY WITH RESPECT TO THE SOLID BODY

FIELD OF THE INVENTION

The present invention relates to an opening mechanism used for electronic devices such as mobile phones and PCs, and also relates to an electronic device using the opening mechanism.

BACKGROUND OF THE INVENTION

In recent years, electronic devices such as mobile phones and PCs have been increasing in functionality and versatility, and decreasing in size. More and more such electronic devices have been using an opening mechanism which enables them to be opened or closed by rotating or sliding a movable case with respect to a solid case. With this trend, opening mechanisms used for these electronic devices also have been expected to have a thinner profile and to be less expensive.

One such conventional opening mechanism and an electronic device using it will be described as follows with reference to FIGS. 4A-4B and 5. Note that FIGS. 4A and 4B are not limited to the conventional mobile phones, but hold true to general mobile phones. FIG. 5 is an exploded perspective view of the conventional opening mechanism. Solid body 1 made of metal such as steel material is provided on its top surface with movable body 2 made of metal. Solid body 1 is also provided on its both side surfaces with guide grooves 1A as a guide mechanism, whereas movable body 2 is provided on its inner side surfaces with projections 2A. Projections 2A are inserted into guide grooves 1A to hold movable body 2 in such a manner as to be slidable in the back-and-forth direction with respect to solid body 1.

Spring 3, which is made of steel wire or the like and coiled a plurality of times at its center, is inserted at one end into hole 1B of solid body 1 and at the other end into hole 2B of movable body 2.

Disposing spring 3 that is in a little sagged state between solid body 1 and movable body 2 energizes movable body 2 in the forward direction, that is, in the direction opposite to the arrow shown in FIG. 4B with respect to solid body 1, thereby forming opening mechanism 5.

Opening mechanism 5 thus structured is attached as shown in the perspective views of the mobile phone in FIGS. 4A and 4B. More specifically, solid body 1 is fixedly attached to solid case 6, which is provided on its top surface with operation unit 6A consisting of a plurality of keys. Movable body 2 is fixedly attached to movable case 7, which is provided on its top surface with display unit 7A such as a liquid crystal display element, voice output unit 7B such as a speaker, and voice input unit 7C such as a microphone. Opening mechanism 5 makes movable case 7 held in such a manner as to be slidable in the back-and-forth direction with respect to solid case 6, thereby forming an electronic device.

In the aforementioned structure, while movable body 2 is being energized in the forward direction with respect to solid body 1 by spring 3, movable case 7 to which movable body 2 has been attached is closed with respect to solid case 6 as shown in FIG. 4A.

Sliding movable case 7 that is in the closed state by hand in the backward direction indicated by the arrow of FIG. 4B allows movable body 2 attached on movable case 7 to be slid in the backward direction. When hole 2B of movable body 2 exceeds the position of hole 1B of solid body 1, spring 3 is reversed to energize movable body 2 in the backward direction so as to open movable case 7, thereby allowing the operation of operation unit 6A thus exposed.

In this manner, movable case 7 can be closed or opened with respect to solid case 6 by sliding movable body 2 attached to movable case 7 in the forward or backward direction, thereby making spring 3 energize movable body 2 in the forward or backward direction.

Japanese Patent Unexamined Publication No. 2003-110675 discloses a mobile phone having this structure.

However, the aforementioned conventional opening mechanism and electronic device using this mechanism has a guide mechanism structured as follows. Solid body 1 made of metal is provided on its both side surfaces with guide grooves 1A as shown in FIG. 5, and movable body 2 is provided on its inner side surfaces with projections 2A which are inserted into guide grooves 1A. As a result, movable body 2 is slidable in the back-and-forth direction with respect to solid body 1. This structure requires that solid body 1 have a certain degree of thickness, making it impossible for the opening mechanism to have a thinner profile. Furthermore, forming guide grooves 1A on the side surfaces of solid body 1 made of metal requires a time-consuming process such as metal cutting or extrusion for component production, thereby leading to a cost increase.

SUMMARY OF THE INVENTION

The present invention provides an opening mechanism which comprises:
  a solid body having a planar shape;
  a movable body disposed on the top surface of the solid body; and
  a guide mechanism for holding the movable body in such a manner as to be slidable in a predetermined direction with respect to the solid body, wherein
  the guide mechanism is disposed between the opposing surfaces of the solid body and the movable body.

The present invention further provides an electronic device using the opening mechanism.

DETAILED DESCRIPTION OF PREFERRED EMODIMENTS

Figure 1:
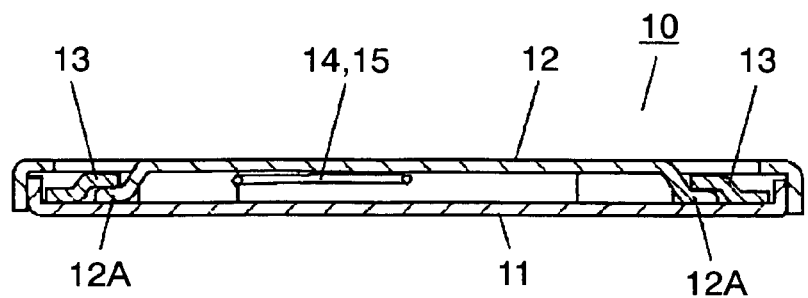
FIG. 1 is a cross sectional view of an opening mechanism according to an embodiment of the present invention.

The present invention provides an opening mechanism in which a guide mechanism is disposed between the opposing surfaces of a solid body and a movable body so as to hold the movable body in such a manner as to be slidable in a predetermined direction with respect to the solid body. Disposing the guide mechanism between the opposing surfaces of the solid body and the movable body allows the solid body and other components to be made of a steel plate or other planar materials, thereby enabling the opening mechanism to have a thinner profile. In addition, the solid body and other components can be produced by a comparatively simple process such as press working, making it possible to provide a less expensive opening mechanism.

The present invention provides another opening mechanism in which a guide mechanism is formed integrally with a solid body and a movable body. This structure can reduce the number of components to make the opening mechanism less expensive.

The present invention further provides an electronic device in which the solid body and the movable body of the aforementioned opening mechanism are attached to a solid case and a movable case, respectively, to hold the movable case in such a manner as to be movable in a predetermined direction with respect to the solid case. This electronic device can be manufactured with ease and at low cost.

An embodiment of the present invention will be described in more detail as follows, with reference to FIGS. 1 to 4. The same components as those described in BACKGROUND OF THE INVENTION will be refereed to with the same reference numerals and signs, and their description will be briefed. Note that the drawings are only schematic and do not show exact dimensions of each component. Also note that the present invention is not limited to the embodiment.

Embodiment

Figure 2:
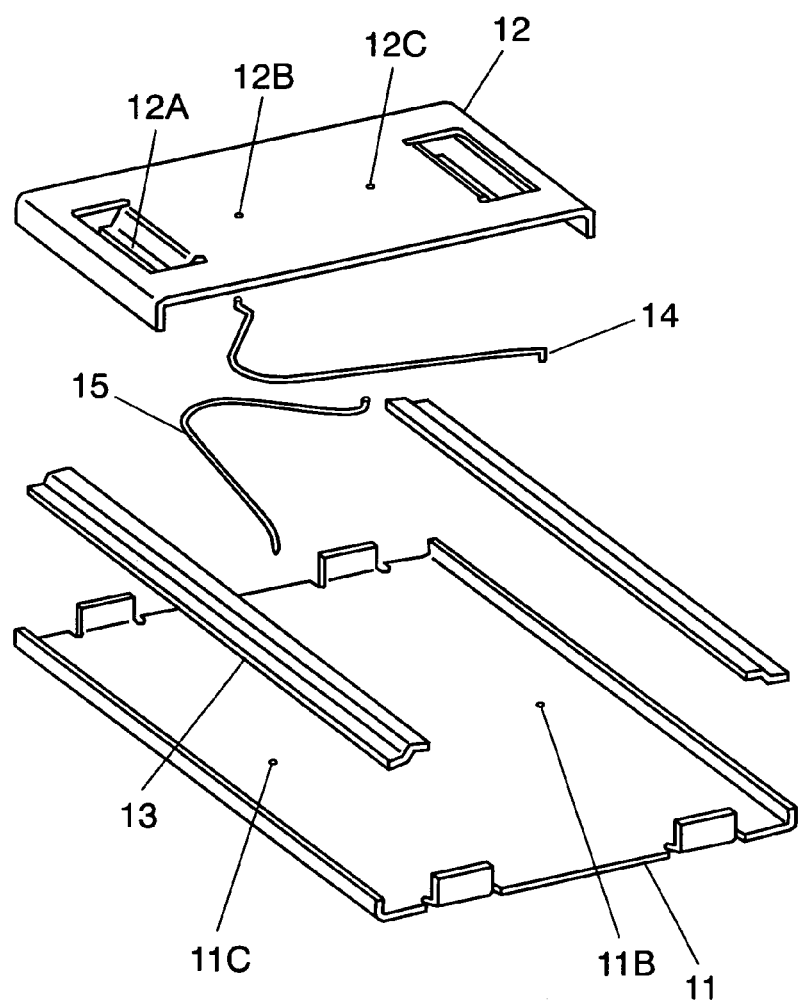
FIG. 2 is an exploded perspective view of the opening mechanism shown in FIG. 1.

An embodiment of the present invention will be described as follows, with reference to FIGS. 1 and 2.

Solid body 11 made of metal such as a steel plate or a copper alloy plate is provided on its top surface with movable body 12 which is also metallic and planar.

The top surface of solid body 11 is provided on its both ends with guide bodies 13 which are metallic, planar and bent so as to have a difference in level. Movable body 12 is provided on its both ends with guide pieces 12A which are bent to project downward from the bottom surface of movable body 12.

Guide pieces 12A projecting from the bottom surface of movable body 12 are inserted between the top surface of solid body 11 and guide bodies 13. Thus, the guide mechanism is disposed between the bottom surface of movable body 12 and the top surface of solid body 11, or between their opposing surfaces, to hold movable body 12 in such a manner as to be slidable in the back-and-forth direction with respect to solid body 11.

Springs 14 and 15 are made of steel wire or copper alloy, and bent in the middle like the letter U. One end of spring 14 and one end of spring 15 are inserted respectively into holes 11B and 11C of solid body 11. The other ends of springs 14 and 15 are inserted into holes 12B and 12C, respectively, of movable body 12. Disposing springs 14 and 15 that is in a little sagged state between the top surface of solid body 11 and the bottom surface of movable body 12 energizes movable body 12 in the forward direction with respect to solid body 1, thereby forming opening mechanism 10.

Since it is disposed between the opposing surfaces of solid body 11 and movable body 12, the guide mechanism, which is formed of guide bodies 13 and guide pieces 12A as described above, has the following feature.

Solid body 11, movable body 12 and guide bodies 13 can not only be formed of planar metal, but also be produced in a comparatively simple process such as press working.

Opening mechanism 10 thus structured is attached as shown in the perspective view of the mobile phone of FIG. 4A as follows. Solid body 11 is fixedly attached to solid case 6, which is provided on its top surface with operation unit 6A consisting of a plurality of keys. Movable body 12 is fixedly attached to movable case 7, which is provided on its top surface with display unit 7A such as a liquid crystal display element, voice output unit 7B such as a speaker, and voice input unit 7C such as a microphone. Opening mechanism 10 makes movable case 7 held in such a manner as to be slidable in the back-and-forth direction with respect to solid case 6, thereby forming the electronic device.

Figure 4A:
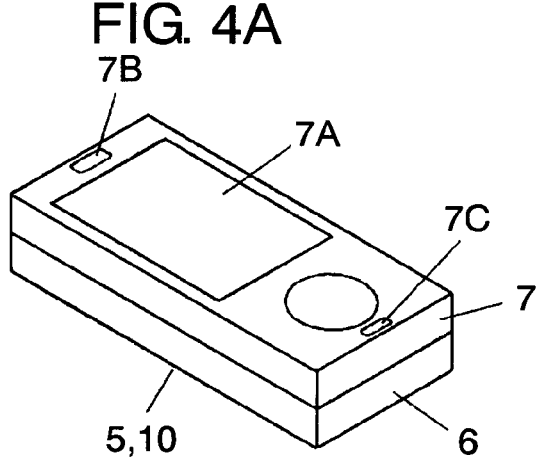
FIGS. 4A and 4B are perspective views of a mobile phone.

In the aforementioned structure, while movable body 12 is being energized in the forward direction with respect to solid body 1 by springs 14 and 15, movable case 7 to which movable body 12 has been attached is closed with respect to solid case 6 as shown in FIG. 4A.

Figure 4B:
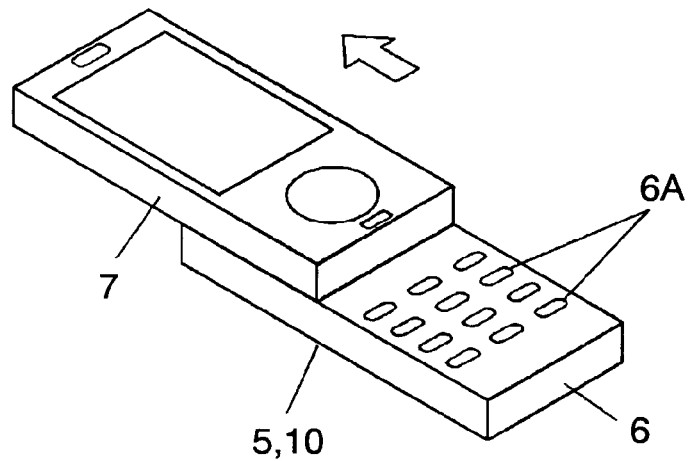
Figure 5:
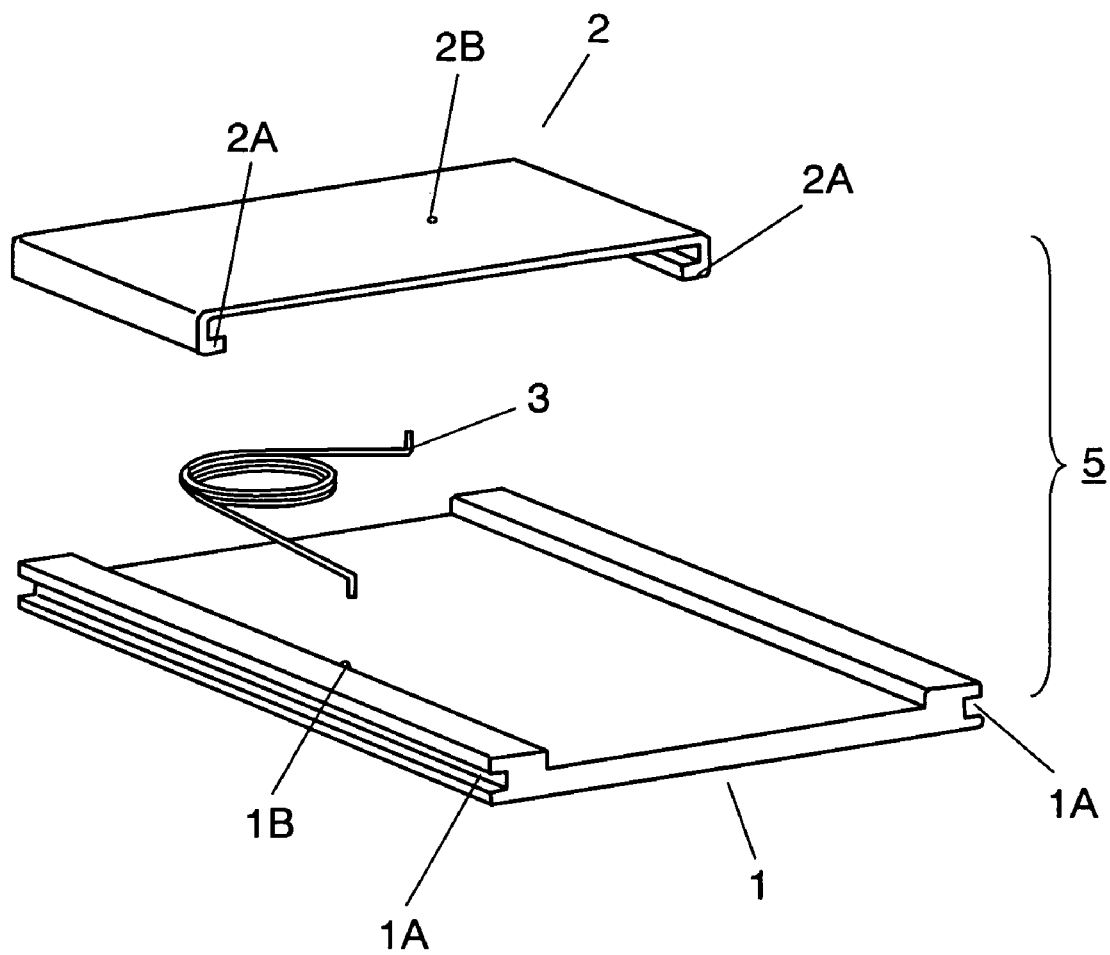
FIG. 5 is an exploded perspective view of a conventional opening mechanism.

Sliding movable case 7 that is in the closed state by hand in the backward direction indicated by the arrow of FIG. 4B allows movable body 12 attached on movable case 7 to be slid in the backward direction. When holes 12B and 12C of movable body 12 exceed the positions of holes 11B and 11C of solid body 11, springs 14 and 15 are reversed to energize movable body 12 in the backward direction so as to open movable case 7, thereby allowing the operation of operation unit 6A thus exposed.

In other words, movable case 7 can be closed or opened with respect to solid case 6 by sliding movable body 12 attached to movable case 7 in the forward or backward direction so as to energize movable body 12 in the forward or backward direction by springs 14 and 15.

During the opening and closing operations, movable body 12 can be slid with respect to solid body 11 with no rattling by the guide mechanism provided between the opposing surfaces of movable body 12 and solid body 11 by inserting guide pieces 12A projecting from the bottom surface of movable body 12 between the top surface of solid body 11 and guide bodies 13.

As described hereinbefore, the present embodiment forms the opening mechanism by disposing the guide mechanism, which holds movable body 12 in such a manner as to be movable in the predetermined direction with respect to planar solid body 11, between the opposing surfaces of solid body 11 and movable body 12.

This structure allows solid body 11, movable body 12 and guide bodies 13 to be made of planar materials such as a steel plate, thereby enabling the opening mechanism to have a thinner profile. In addition, these components can be produced by a comparatively simple process such as press working, making it possible to obtain an opening mechanism which can be manufactured with ease and at low cost, and also to obtain an electronic device using the opening mechanism.

Figure 3:
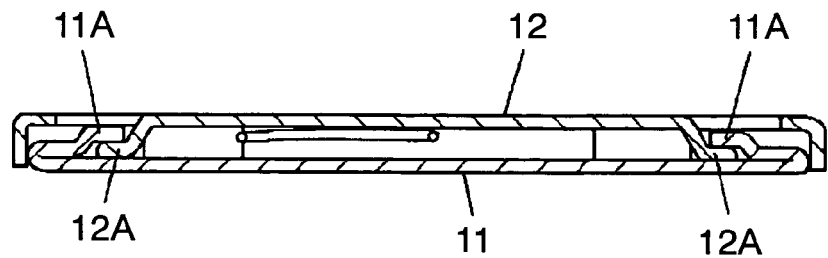
FIG. 3 is a cross sectional view of an opening mechanism according to another embodiment of the present invention.

As shown in the cross sectional view of FIG. 3, movable body 12 is provided on its both ends with guide pieces 12A which are integrated with the bottom surface of movable body 12 by being bent to project downward from the bottom surface. Solid body 11 is bent upwardly at its both ends so as to form guide units 11A integrally with its top surface, instead of forming guide bodies 13. Guide pieces 12A projecting from the bottom surface of movable body 12 are inserted into guide units 11A to form a guide mechanism. The absence of guide bodies 13 reduces the number of components, thereby enabling the opening mechanism to be less expensive.

The opening mechanism and the electronic device using the opening mechanism according to the present invention have a thin profile and are produced with ease and at low cost. This enables the opening mechanism to be used for electronic devices of various kinds.

What is claimed is:

1. An opening mechanism comprising:
   a solid body having a planar shape;
   a movable body disposed on a top surface of the solid body;

at least one spring coupled to the solid body and the movable body, the spring biasing the solid body relative to the movable body; and an elongate guide body for holding the movable body in such a manner as to be slidable in a predetermined direction with respect to the solid body, the guide body including (i) a first portion contacting the solid body, (ii) a second portion defining a gap with the solid body, a portion of the movable body positioned within the gap, and (iii) a third portion extending diagonally between the first and second portions of the guide body wherein the guide body is disposed between opposing surfaces of the solid body and the movable body.

2. The opening mechanism according to claim 1, wherein the guide mechanism is formed integrally with the solid body and the movable body.

3. An electronic device comprising:

a solid body; and a movable body, the movable body disposed on a top surface of the solid body; the solid body and the movable body attached to a solid case and a movable case, respectively, so that the movable case is held in such a manner as to be slidable in a predetermined direction with respect to the solid case;

at least one spring coupled to the solid body and the movable body, the spring biasing the solid body relative to the movable body; and an elongate guide body for holding the movable body in such a manner as to be slidable in a predetermined direction with respect to the solid body, the guide body including (i) a first portion contacting the solid body, (ii) a second portion defining a gap with the solid body, a portion of the movable body positioned within the gap, and (iii) a third portion extending diagonally between the first and second portions of the guide body, wherein the guide body is disposed between opposing surfaces of the solid body and the movable body.

* * * * *